US007349693B2

(12) United States Patent
Wang

(10) Patent No.: US 7,349,693 B2
(45) Date of Patent: Mar. 25, 2008

(54) METHOD FOR IMPLEMENTING A CALL CONNECTION BETWEEN A NON-LOCAL CALLING SUBSCRIBER AND A LOCAL CALLED SUBSCRIBER WHO IS AN INTELLIGENT NETWORK SUBSCRIBER

(75) Inventor: Jincheng Wang, Guangdong (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/486,322

(22) PCT Filed: Mar. 29, 2002

(86) PCT No.: PCT/CN02/00219

§ 371 (c)(1),
(2), (4) Date: Jul. 12, 2004

(87) PCT Pub. No.: WO03/015437

PCT Pub. Date: Feb. 20, 2003

(65) Prior Publication Data
US 2004/0242225 A1  Dec. 2, 2004

(30) Foreign Application Priority Data
Aug. 7, 2001  (CN) .................. 2001 1 0239484

(51) Int. Cl.
*H04Q 7/20* (2006.01)

(52) U.S. Cl. .................. 455/432.1; 455/445; 455/433; 455/428; 455/403

(58) Field of Classification Search ............ 455/432.1, 455/422.1, 459, 433, 445, 406, 428, 417, 455/414.1, 403; 370/352, 329, 277, 310, 370/351; 379/210.1; 709/227, 223
See application file for complete search history.

(56) References Cited

U.S. PATENT DOCUMENTS 5,629,974 A * 5/1997 Rajala et al. ............... 455/466
(Continued)

FOREIGN PATENT DOCUMENTS

CN     A 1194758     9/1998
(Continued)

OTHER PUBLICATIONS

Supplementary European Search Report for European Patent Application No. 02 719 621.1, dated Aug. 7, 2006.
(Continued)

*Primary Examiner*—George Eng
*Assistant Examiner*—Huy Q. Phan

(57) ABSTRACT

The present invention discloses a method for implementing a call connection between a non-local calling subscriber and a local called subscriber who is an intelligent network subscriber. The method comprises the following steps: a. a non-local Gateway Mobile Switching Center (GMSC) initiating a Send Routing Information (SRI) operation to a Home Location Register (HLR) to request the roaming number of the called subscriber; b. the HLR returning a virtual roaming number to the non-local GMSC, and the non-local GMSC connecting the call to a Service Switching Point (SSP) of an intelligent platform according to the virtual roaming number; c. the SSP initiating a SRI operation to the HLR with the virtual roaming number in an Initialize Address Information (IAI) message; d. after finding the number in the SRI operation is a virtual roaming number allocated before, the HLR returning the actual subscriber number corresponding to the roaming number and CAMEL Subscription Information (CSI) data of the intelligent network subscriber corresponding to the actual subscriber number to said SSP; and e. the SSP triggering service logic based on said CSI data, and connecting the call to a Visited Mobile Switching Center (VMSC) corresponding to the called subscriber. With this method, the billing system of mobile intelligent network can be improved.

12 Claims, 4 Drawing Sheets

U.S. PATENT DOCUMENTS

| | | | |
|---|---|---|---|
| 5,727,057 A * | 3/1998 | Emery et al. | 379/201.07 |
| 6,044,264 A | 3/2000 | Huotari et al. | |
| 6,064,887 A * | 5/2000 | Kallioniemi et al. | 455/445 |
| 6,067,456 A | 5/2000 | Duran et al. | |
| 6,122,510 A | 9/2000 | Granberg et al. | |
| 6,353,740 B1 * | 3/2002 | Granberg | 455/432.1 |
| 6,490,450 B1 | 12/2002 | Batni et al. | |
| 6,535,741 B1 * | 3/2003 | Aschir et al. | 455/445 |
| 6,545,987 B1 * | 4/2003 | Becher | 370/328 |
| 6,760,343 B1 * | 7/2004 | Krishnamurthy et al. | 370/466 |
| 6,876,860 B1 * | 4/2005 | Berg et al. | 455/459 |
| 2001/0028641 A1 * | 10/2001 | Becher et al. | 370/352 |
| 2004/0120494 A1 * | 6/2004 | Jiang et al. | 379/210.01 |
| 2004/0133685 A1 * | 7/2004 | Jaaskela et al. | 709/227 |

FOREIGN PATENT DOCUMENTS

| | | |
|---|---|---|
| EP | 0740484 A | 10/1996 |
| WO | WO A 0013454 | 3/2000 |
| WO | WO A 0027144 | 5/2000 |

OTHER PUBLICATIONS

European Office Action for Patent Application No. 02 719 621.1, dated Nov. 8, 2006.

* cited by examiner

METHOD FOR IMPLEMENTING A CALL CONNECTION BETWEEN A NON-LOCAL CALLING SUBSCRIBER AND A LOCAL CALLED SUBSCRIBER WHO IS AN INTELLIGENT NETWORK SUBSCRIBER

This application is a National Stage of International application No. PCT/CN02/00219, filed Mar. 29, 2002, and published in Chinese on Feb. 20, 2003 as International Application No. WO 03/015437 Al. This application claims the benefit of CN Application No. 01123948.4, filed Aug. 7, 2001. The disclosure(s) of the above applications are incorporated herein by reference.

FIELD OF THE TECHNOLOGY

The invention relates to a method for implementing a call connection between a non-local calling subscriber and a local called subscriber who is an intelligent network subscriber in which the intelligent incoming call from the non-local subscriber can be forwarded to a local Mobile Switching Center (MSC) with capability of Service Switching Point (SSP) to complete the service logic through extracting the roaming number of the called subscriber.

BACKGROUND OF THE INVENTION

At present, the Chinese mobile service providers, such as China Mobile Communications Corporation and China United Telecommunications Corporation, have established domestic mobile intelligent networks in which value-added services can be provided and some prepaid services have been provided already. At the same time, mobile service providers in each area also have established local mobile intelligent networks in order to provide some value-added services that are suitable for this zone. During this process, billing for intelligent network subscribers in the province is implemented on intelligent platform. The overlay solution scheme is used in the process of establishing mobile intelligent networks. In this way, only a part of MSCs have the capability of SSP, and the MSCs without the capability of SSP forward the calls from the intelligent network subscribers to those with the capability of SSP in which corresponding service logic will be triggered and implemented. Therefore, any call that has been connected without passing an intelligent platform for billing will not be billed again. Thus, it is necessary for each call relating to intelligent network subscribers to be triggered to the intelligent platform.

For the local MSCs, through formulating data for calls, all calls relating to intelligent network subscribers can be directly forwarded to SSP in which corresponding service logic will be triggered to the intelligent platform. Nevertheless, in the case that a fixed phone subscriber or a non-local mobile phone subscriber calls a local intelligent network subscriber, since a Gateway Mobile Switching Center (GMSC) of another zone doesn't formulate data for the calls, the calls relating to the intelligent network subscribers cannot be routed to the local SSPs from the non-local GMSCs. In general, a GMSC directly obtains the roaming number of intelligent network subscribers from the Home Location Register (HLR) in which the intelligent network subscriber registered and directly routes the calls to the Visited Mobile Switching Center (VMSC) in which the intelligent network subscribers located without passing the intelligent platform of this zone for billing.

SUMMARY OF THE INVENTION

An object of the invention is to provide a method for implementing a call connection between a non-local calling subscriber and a local called subscriber who is an intelligent network subscriber so that an intelligent incoming call from a non-local subscriber can be forwarded to the local MSC with SSP capability. In this way, the call can be billed in local intelligent platform and the billing system can be perfect.

In order to achieve the object, a method for implementing a call connection between a non-local calling subscriber and a local called subscriber who is an intelligent network subscriber comprises:

a non-local GMSC initiating a Send Routing Information (SRI) operation to a HLR to request the roaming number of the called subscriber;

the HLR returning a virtual roaming number to the non-local GMSC, and the non-local GMSC connecting the call to a SSP of an intelligent platform according to the virtual roaming number;

the SSP initiating a SRI operation to the HLR with the virtual roaming number in an Initialize Address Information (IAI) message;

after finding the number in the SRI operation is a virtual roaming number allocated before, the HLR returning the actual subscriber number corresponding to the virtual roaming number and CAMEL Subscription Information (CSI) data of the intelligent network subscriber corresponding to the actual subscriber number to the SSP; and the SSP triggering service logic based on the CSI data, and connecting the call to a VMSC corresponding to the called subscriber.

In the above-mentioned method, said returning a virtual roaming number and connecting the call to a SSP comprises after receiving the SRI operation and determining that the subscriber corresponding to the SRI operation is an intelligent network subscriber, the HLR sending the non-local GMSC a SRI acknowledgement (SRIack) message which includes a virtual roaming number allocated according to the Globe Title (GT) of the SSP, and recording correspondence relationship between the virtual roaming number and the real mobile station ISDN (MSISDN) number; and the non-local GMSC sending an IAI message to the SSP according to the virtual roaming number returned in the SRIack message, and routing the call to the SSP of the local intelligent platform.

The SSP triggering service logic and connecting the call to a VMSC comprises:

after having obtained the real MSISDN and CSI data of the called subscriber, the SSP sending an Initiate Detection Point (IDP) message to a SOP of the intelligent platform to trigger a called procedure to the intelligent platform;

during processing the IDP message, the SCP sequentially sending a Request Report Basic Call State Model (BCSM event (RRBE) and an Apply Charging (AC) operation to the SSP;

after having processed corresponding intelligent service, the SOP sending a continue message to the SSP to inform that the call can be connected;

after receiving the continue message, the SSP sending a SRI message to the HLR;

after receiving the SRI, the HLR sending a Provide Roaming Number (PRN) operation to a Visited Location Register (VLR) to obtain the real roaming number of the subscriber;

after receiving the PRN operation, the VLR returning a PRN acknowledgement (PRNack) and the roaming number of the subscriber to the HLR;

the HLR then returning the real roaming number of the subscriber to the SSP; and the SSP connecting the call to the VMSC corresponding to the called subscriber according to the real roaming number of the subscriber.

In the above-mentioned method, the communication between the SSP and SCP applies CAMEL Application Part (CAP) signaling protocol. The SRI message does not include CSI data.

The method may further comprise:
billing for the call in the intelligent platform.

The above-mentioned SSP meets the standards of European Telecommunication Standard Institute (ETSI). If there is no such SSP in the local MSC, then a SSP meeting the standards of ETSI must be newly established.

If the SRIack does not include MSISDN, the SSP triggers a service using a virtual called number in the SRI operation. If the SRIack includes MSISDN, the SSP triggers a service using MSISDN in the SRIack message.

The method may further comprise: the
HLR directly returning the CSI data or the roaming number of the subscriber if the SRI operation sent to the HLR includes a real subscriber number and does not include the CSI data.

The key point of the invention is that during getting the roaming number of the called subscriber, the incoming call is first routed to a SSP of an intelligent platform SSP in the local network so as to complete triggering, performing and billing of service logic. If there is no SSP meeting the standards of ETSI in the local network, it is necessary to newly establish such a SSP.

It can be seen the calls are routed to the standard SSP in local network in the solution for incoming calls from foreign areas according to the present invention. The calls are triggered to the intelligent platform, so that the intelligent platform can billing for the calls. In this way, the billing system of mobile intelligent network is improved, and interest of service providers is furthered.

DETAILED DESCRIPTION OF THE INVENTION

The invention will be described in more detail hereinafter with reference to the accompanying drawings and embodiments.

Figure 1:
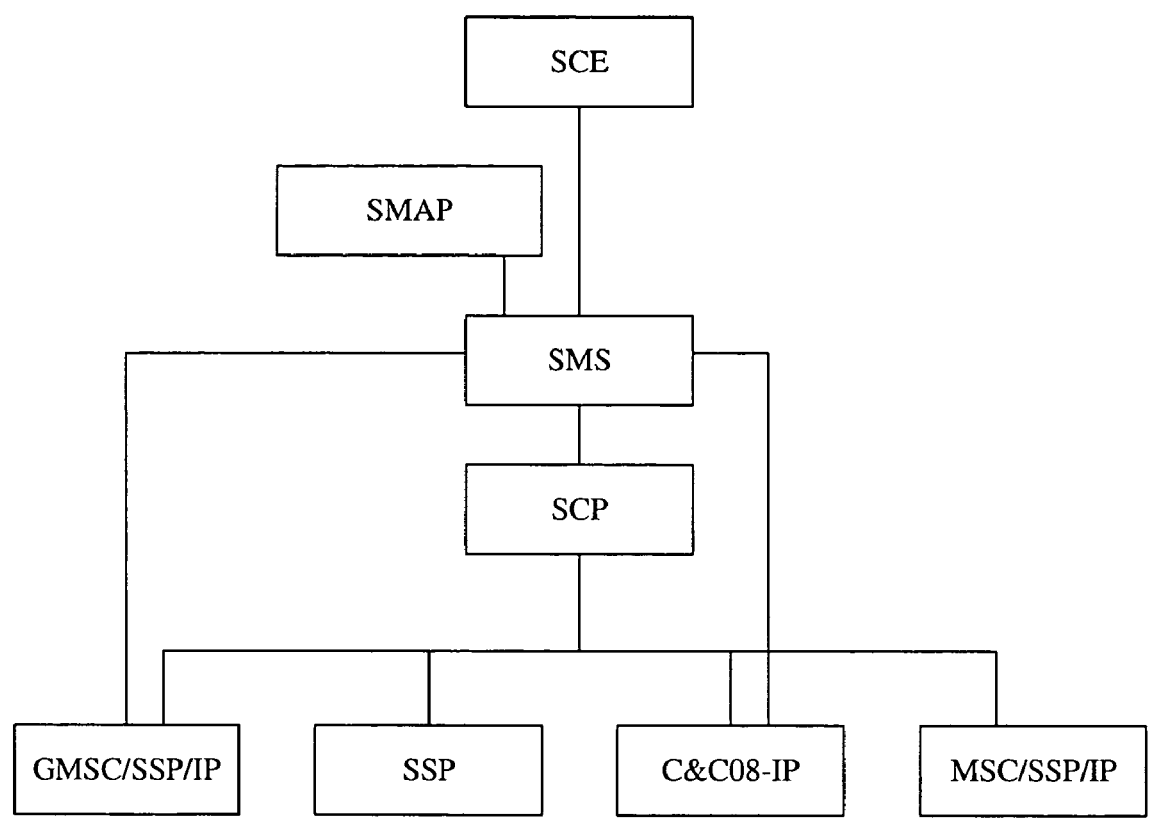
FIG. 1 is a schematic diagram illustrating system architecture of a wireless intelligent network platform.

FIG. 1 is a schematic diagram illustrating system architecture of a wireless intelligent network platform. As shown in FIG. 1, a wireless intelligent network platform comprises a SSP, a SCP, a Signaling Transfer Point (STP), Intelligent Peripherals (IPs), a Service Management System (SMS) and a Service Creation Environment (SCE) etc.

The SSP is a connection point between the existing wireless network and the intelligent network, and it provides function sets of access intelligent network. The SSP can not only detect an intelligent service request and communicate with the SCP, but also respond to requests from a SCP and allow service logic in SCP to instruct the call processing.

The SCP is the core element of intelligent network, and it stores subscriber data and service logic. According to the interrogating request from the SSP, the SCP interrogates the database and analyzes the result. In addition, the SCP can initiate appropriate service logic according to the call event sent by the SSP, and can send call control instructions to corresponding SSP according to service logic so as to implement various intelligent calls.

The IP is special resource for intelligent services. Usually it has various voice functions, such as voice synthesis, voice announcement, voice recognition and dual-tone multi-frequencies (DTMF) digit collection etc. The IP can be an independent device or a part of the SSP. Under the control of SCP, the IP can execute operations pointed by service logic in the SCP.

The SMS is a computer system, and usually it has five functionalities: service logic management, service data management, subscriber data management, service monitoring and service volume management. A new service logic created at the SCE is inputted to the SMS by the service provider and loaded to the SCP by the SMS. Then the new service can be provided in communication network.

The SCE is used to create new service logic based on the requirements of a subscriber. The SCE provides a friendly graphic interface for service designers. A user can use various standard graphic elements to design service logic of a new service and define corresponding data.

In prior mobile intelligent network, some SSPs are vendor dependent without meeting the standards of ETSI, and some local area networks do not even include a SSP. In order to implement the invention, a SSP meeting the standards of ETSI must be included in the local network. If there is no such a SSP in the local network, then it must be newly established in advance.

Figure 2:
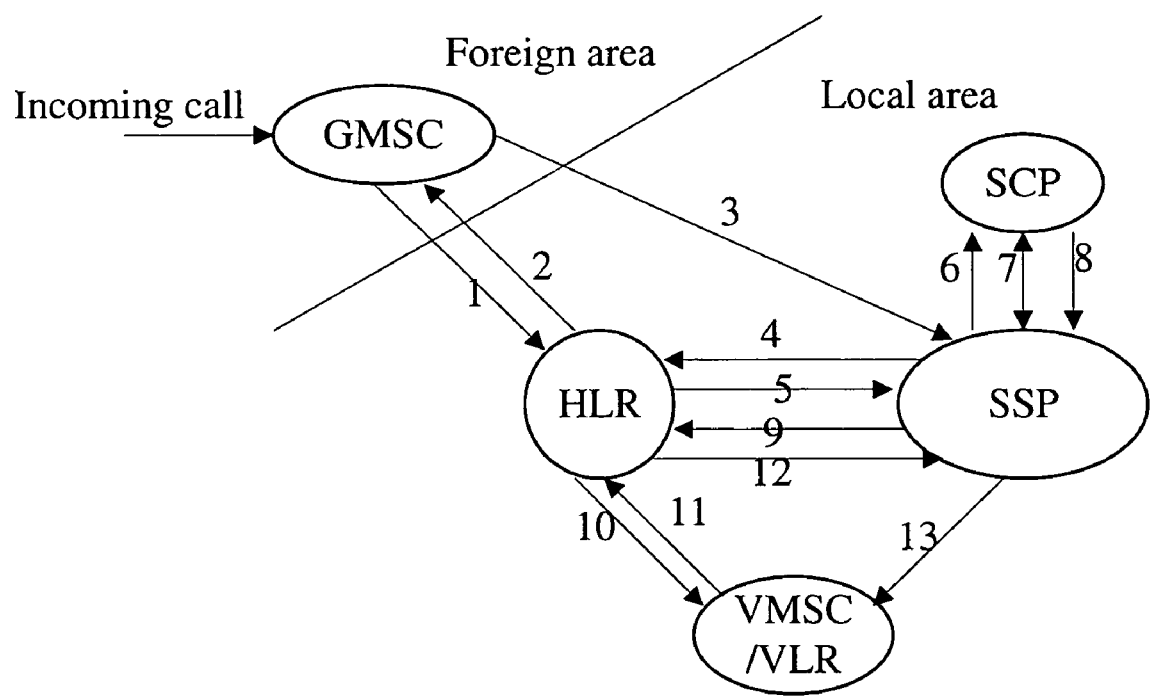
FIG. 2 is a schematic diagram illustrating networking structure of the implementing environment of the invention.

As shown in FIG. 2, in this invention, when a non-local GMSC requests roaming number of an intelligent network subscriber from a local HLR, the HLR will response a virtual roaming number based on the mscNumber of the newly established SSP, for example, the virtual roaming number will be 8613012345001 if the mscNumber is 8613012345. Thus, the GMSC routes the call to this newly established SSP, then the SSP obtains real called number and the roaming information of the called party from the HLR based on the virtual roaming number (8613012345001), and triggers the intelligent service to the intelligent platform to prepare the billing at the intelligent platform. After the service has been triggered, the SSP will connect the call to the VMSC where the called intelligent network subscriber is located according to the real roaming number so as to complete the call connection.

Figure 3:
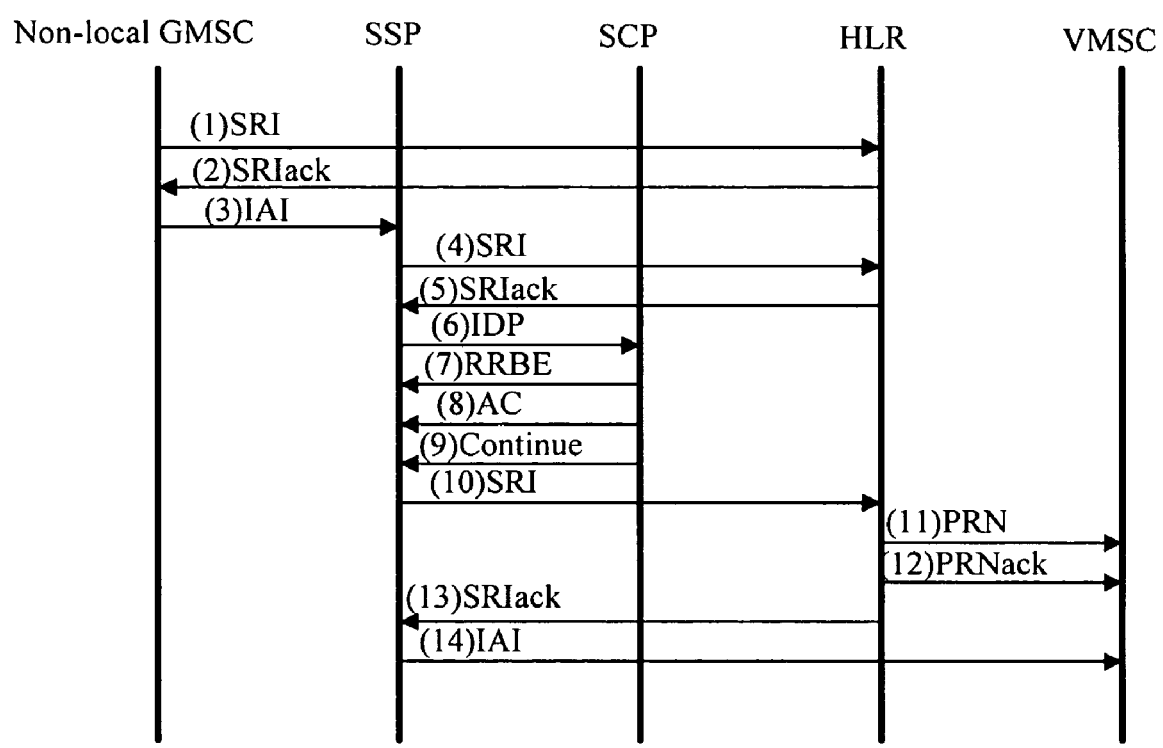
FIG. 3 is a flowchart of singling according to an embodiment of the invention.

Referring to FIG. 2 and FIG. 3, when a non-local GMSC initiates a call to an intelligent network subscriber, at least the following signaling steps are included.

(1) Send Routing Information (SRI)

When a call reaches a non-local GMSC, the GMSC will directly obtain the route to the called subscriber from the HLR based on the called number. Then the GMSC sends a SRI operation to the HLR. Here, suppose the called number is 13012345678.

(2) Send Routing Information acknowledgement (SRIack)

After having received the SRI operation, the HLR discovers that the GMSC is not in the supported GMSC list of the Customized Applications for Mobile Networks Enhanced Logic (CAMEL) Phase 2 but the called subscriber of the SRI is an intelligent network subscriber, then the HLR returns to the GMSC a virtual roaming number allocated based on the Global Title (GT) of the newly established SSP. For example, the virtual roaming number 8613000555001 is allocated to the called number 13012345678. At the same time, the HLR records the correspondence relationship between the allocated virtual roaming number and the real called mobile station ISDN number (MSISDN).

(3) Initialize Address Information (IAI)

The GMSC sends an IAI message to the corresponding SSP based on the returned virtual roaming number in SRIack, and route the call to the newly established SSP in this provincial network. The called number in the IAI message is the virtual roaming number 8613000555001.

(4) SRI

After having received the IAI message, the SSP sends a SRI operation to the HLR according to the called number 8613000555001. CAMEL Subscription Information (CSI) data is not suppressed in the SRI, that is, the SRI may include CSI data.

(5) SRIack

When having received the SRI operation sent by the SSP, the HLR obtains the real called number through correspondence relationship between the virtual roaming number and the real called MSISDN which is stored in the HLR, and finds that the called subscriber is an intelligent network subscriber through subscriber database in the HLR. Then, the HLR returns the real MSISDN and CSI data of the subscriber to SSP via a SRIack.

(6) Initiate Detection Point (IDP)

After having obtained the real MSISDN and CSI data of the subscriber, the SSP initiates an IDP message to the SCP of the intelligent platform to trigger a called procedure on the intelligent platform. The triggered called number is the MSISDN returned from the HLR via SRIack in Step 5, rather than the called number in IAI message in Step 3.

(7) Signaling interaction between SSP and CAMEL Application Part (CAP) of SCP

During processing IDP messages, the SOP makes the intelligent service signaling interaction with the SSP through CAP signaling. Usually, the signaling procedure is that the SCP sequentially sends a Request Report Basic Call State Model (BCSM) Event (RRBE) and an Apply Charging (AC) operation to the SSP.

(8) Continue

After having processed the intelligent service, the SCP will send a continue message to the SSP to inform that the call can be connected.

(9) SRI

The SSP sends a SRI operation to the HLR. The CSI data is suppressed in the SRI operation, that is, no CSI data is included in it.

(10) Provide Roaming Number (PRN)

The HLR sends a PRN request to a Visited Location Register (VLR) to obtain the real roaming number of the subscriber.

(11) Provide Roaming Number acknowledgement (PRNack)

After having received the PRN request, the VLR returns the roaming number of the subscriber to the HLR.

(12) SRIack

The HLR then returns the real roaming number to the SSP.

(13) IAI

According to the real roaming number of the subscriber, the SSP connects the call to the VMSC where the called subscriber is located to complete a call procedure with billing at the intelligent platform of the intelligent network.

In summary, as shown in FIG. 3, when a non-local GMSC initiates a call to an intelligent network subscriber, the following steps are included.

1) A non-local GMSC sends a SRI to HLR to obtain the roaming number of the called subscriber.

2) The HLR returns a virtual roaming number to the GMSC, then the GMSC forwards the call to the SSP of the intelligent platform, as shown in the second and the third steps in FIG. 3.

3) The SSP initiates a SRI operation to the HLR with the virtual roaming number in the IAI message, as shown in the fourth step in FIG. 3.

4) When having discovered that the number in the SRI operation is a virtual roaming number allocated before, since the called subscriber is an intelligent network subscriber, the HLR returns the real called subscriber number corresponding to the roaming number and the CSI data to the SSP. Here, coding rule and format of the virtual roaming number is determined by the service provider.

5) The SSP triggers the service logic based on the CSI of the subscriber, and the triggering procedure is the same as that initiated by a local GMSC, as shown in the sixth to the fourteenth steps in FIG. 3.

At present, a call of an intelligent network subscriber of China United Telecommunications Corporation is controlled by a SSP made by a certain corporation. When a local intelligent network subscriber calls an intelligent network subscriber, first the call is routed to the SSP triggering corresponding intelligent service. After triggering the calling procedure, the SSP sends a SRI operation to the HLR in which the intelligent network subscriber registers to obtain the roaming number of the called subscriber. If the HLR returns a common roaming number, the SSP triggering the intelligent service then connects the call to the VMSC where the called subscriber is located; in this case, the call has not been passed the intelligent platform and the billing has not been done. Therefore, in order to implement billing for the call, the method of the invention must be applied, that is, the call must be routed to a SSP of the intelligent platform from the SSP triggering the intelligent service. The procedure includes the following steps shown in FIG. 4.

1) The SSP triggering the intelligent service sends a SRI operation to HLR to obtain the roaming number of the called subscriber.

Figure 4:
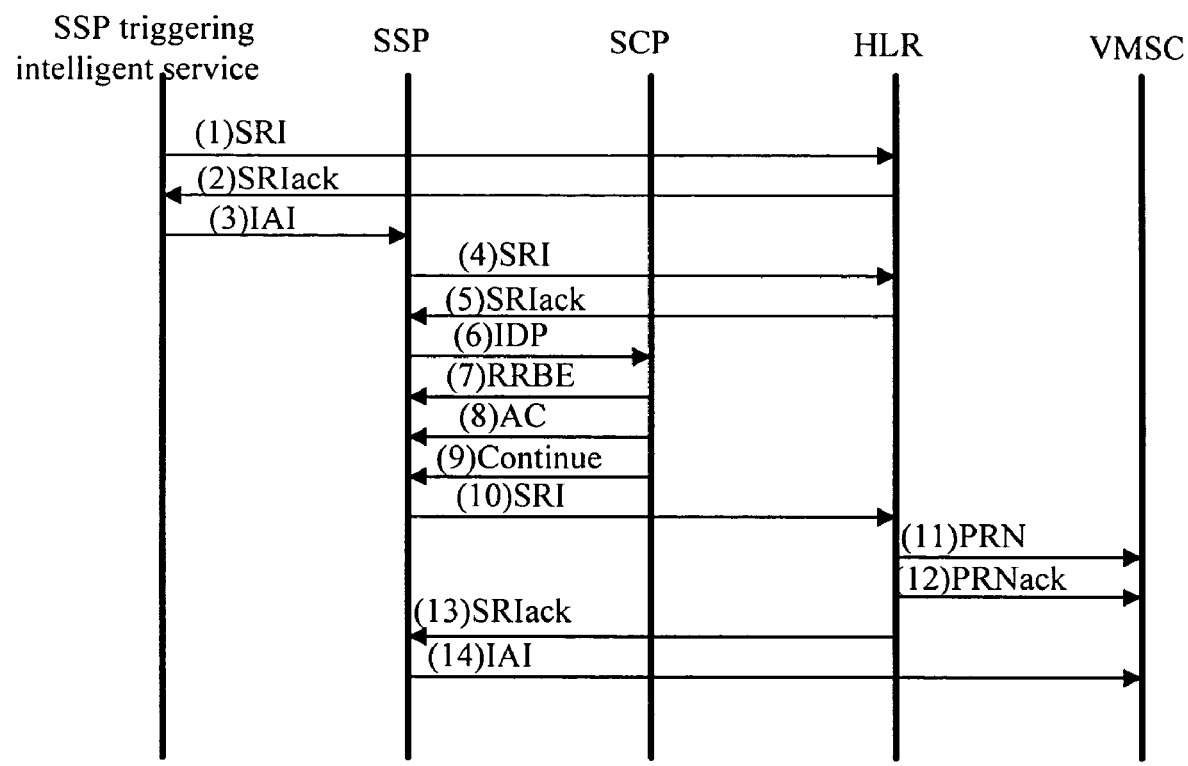
FIG. 4 is a flowchart of singling according to another embodiment of the invention.

2) The HLR returns a virtual roaming number to the SSP triggering the intelligent service which then forwards the call to the SSP of the intelligent platform as shown in the second and the third steps in FIG. 4.

3) The SSP of the intelligent platform initiates a SRI operation to the HLR using the virtual roaming number in the IAI message, as shown in the fourth step in FIG. 4.

4) When discovering that the number in the SRI is a virtual roaming number allocated before, since the subscriber is an intelligent network subscriber, the HLR returns the real subscriber number corresponding to the roaming number and corresponding CSI data to the SSP of the intelligent platform.

5) The SSP of the intelligent platform triggers the service logic based on the CSI of the subscriber, and the triggering procedure is the same as that initiated by a local GMSC, as shown in the sixth to the fourteenth steps in FIG. 4.

In the above-mentioned method for implementing a roaming call for a non-local intelligent network subscriber, the SSP of the intelligent platform can initiate SRI operation based on a virtual roaming number. In addition, the SSP can trigger different services based on whether the SRIack includes MSISDN. In detail, if the SRIack does not include MSISDN, the service is triggered with the original called number in the SRI operation; if the SRIack includes MSISDN, the service is triggered with the MSISDN in the SRIack.

In this method, when a GMSC initiates a SRI operation to a HLR, the HRL must return a virtual roaming number so that the GSMC routes the call to a SSP of an intelligent platform. The HLR must make different processing based on the SRI operation sent by the SSP of the intelligent platform. In detail, if it is a virtual roaming number that the SRI operation brings, the HLR should obtain the real called number of the intelligent network subscriber corresponding to the virtual roaming number, and return the real called number and CSI of the subscriber to the SSP; if the SRI brings in a real called number without CSI, the HLR directly returns the CSI of the subscriber or the roaming number to the SSP.

The invention claimed is:

1. A method for implementing a call connection between a non-local calling subscriber and a local called subscriber who is an intelligent network subscriber, comprising:
   a non-local Gateway Mobile Switching Center (GMSC) initiating a Send Routing Information (SRI) operation to a local Home Location Register (HLR) to request a roaming number of the called subscriber;
   the HLR returning a virtual roaming number allocated by the HLR to the non-local GMSC, the virtual roaming number being allocated according to the address of a Service Switch mci Point (SSP) of an intelligent platform;
   the non-local GMSC connecting the call to the SSP with the virtual roaming number;
   the SSP initiating a SRI operation to the HLR with the virtual roaming number;
   after finding a number contained in the SRI operation is a virtual roaming number allocated before, the HLR returning the actual subscriber number (MSISDN) of the called subscriber corresponding to the virtual roaming number and CAMEL Subscription Information (CSI) data of the called subscriber to said SSP; and
   the SSP triggering service logic based on said CSI data.

2. The method according to claim 1, wherein the HLR returning a virtual roaming number comprises:
   after receiving said SRI operation and determining that the subscriber of the SRI operation is an intelligent network subscriber, the HLR sending to said non-local GMSC a SRI acknowledgement (SRIack) message which includes a virtual roaming number allocated according to the address of said SSP, and recording a correspondence relationship between the virtual roaming number and the real mobile station ISDN (MSISDN) number of the called subscriber; and
   the non-local GMSC connecting the call to the SSP comprises:
   said non-local GMSC sending an Initialize Address Information (IAI) message to said SSP with the virtual roaming number returned by the HLR in the SRIack message, and routing the call to said SSP of the intelligent platform.

3. The method according to claim 2, wherein the SSP triggers a service using a virtual called number in the SRI operation if the SRIack does not include MSISDN, or using MSISDN in the SRIack message if the SRIack includes MSISDN.

4. The method according to claim 1, wherein said SSP triggering service logic and connecting the call to a VMSC comprises:
   after having obtained the MSISDN and CSI data of the called subscriber, said SSP sending an Initiate Detection Point (IDP) message to a SOP of the intelligent platform to trigger a called procedure to the intelligent platform;
   during processing the IDP message, said SOP sequentially sending a Request Report Basic Call State Model (BCSM) event (RRBE) and an Apply Charging (AC) operation to said SSP;
   after having processed corresponding intelligent service, the SCP sending a continue message to said SSP to inform that said call can be connected;
   after receiving said continue message, said SSP sending a SRI message to said HLR;
   after receiving said SRI, said HLR sending a Provide Roaming Number (PRN) operation to a Visited Location Register (VLR) to obtain the real roaming number of the subscriber;
   after receiving said PRN operation, said VLR returning a PRN acknowledgement (PRNack) and the real roaming number of the subscriber to said HLR;
   the HLR then returning the real roaming number of the subscriber to said SSP; and
   the SSP connecting said call to said VMSC corresponding to the called subscriber according to the real roaming number of the subscriber.

5. The method according to claim 4, wherein CAMEL Application Part (CAP) signaling protocol is applied in the communication between said SSP and SCP.

6. The method according to claim 4, wherein the SRI message does not include CSI data.

7. The method according to claim 1, further comprising: billing for the call in the intelligent platform.

8. The method according to claim 1, wherein said SSP meets the standards of European Telecommunication Standard Institute (ETSI).

9. The method according to claim 1, wherein the SSP triggers a service using a virtual called number in the SRI operation if the SRIack does not include MSISDN, or using MSISDN in the SRIack message if the SRIack includes MSISDN.

10. The method according to claim 1, further comprising:
    the HLR directly returning said CSI data or the roaming number of the subscriber if the SRI operation sent to the HLR includes a real subscriber number and does not include the CSI data.

11. The method according to claim 1, wherein the virtual roaming number is allocated according to the Globe Title (GT) of said SSP.

12. The method according to claim 1, wherein the non-local GMSC is not in the supported GMSC list of the Customized Applications for Mobile Networks Enhanced Logic (CAMEL) Phase 2.

* * * * *

UNITED STATES PATENT AND TRADEMARK OFFICE
CERTIFICATE OF CORRECTION

PATENT NO. : 7,349,693 B2 Page 1 of 1
APPLICATION NO. : 10/486322
DATED : March 25, 2008
INVENTOR(S) : Jincheng Wang It is certified that error appears in the above-identified patent and that said Letters Patent is hereby corrected as shown below:

In the Claims:

Column 8, line 9, Claim 4: "SOP" should be --SCP--.

Column 8, line 12, Claim 4: "SOP" should be --SCP--.

Signed and Sealed this

Eighth Day of July, 2008

JON W. DUDAS
*Director of the United States Patent and Trademark Office*